(12) United States Patent
Ramaratnam et al.

(10) Patent No.: US 10,733,676 B2
(45) Date of Patent: Aug. 4, 2020

(54) AUTOMATIC GENERATION OF EXPENSE DATA USING FACIAL RECOGNITION IN DIGITALLY CAPTURED PHOTOGRAPHIC IMAGES

(71) Applicant: Coupa Software Incorporated, San Mateo, CA (US)

(72) Inventors: Arjun Ramaratnam, Fremont, CA (US); Fang Chang, Mountain View, CA (US); Ethan Laub, Williamsville, NY (US); Maggie Mae Joy, Annapolis, MD (US); Mikin Faldu, Fremont, CA (US); Anshuman Nene, Redwood City, CA (US); Jeffrey Hellman, Albuquerque, NM (US)

(73) Assignee: Coupa Software Incorporated, San Mateo, CA (US)

( * ) Notice: Subject to any disclaimer, the term of this patent is extended or adjusted under 35 U.S.C. 154(b) by 156 days.

(21) Appl. No.: 15/982,981

(22) Filed: May 17, 2018

(65) Prior Publication Data

US 2019/0355065 A1   Nov. 21, 2019

(51) Int. Cl.
*G06Q 40/00*     (2012.01)
*G06Q 30/02*     (2012.01)
(Continued)

(52) U.S. Cl.
CPC ......... *G06Q 40/12* (2013.12); *G06K 9/00268* (2013.01); *G06K 9/00288* (2013.01);
(Continued)

(58) Field of Classification Search
CPC ............... G06Q 40/12; G06Q 30/0283; G06K 9/00288; G06K 9/6201; G06K 9/00268; G06F 3/0482
See application file for complete search history.

(56) References Cited

U.S. PATENT DOCUMENTS 6,072,894 A * 6/2000 Payne ................... G07C 9/37
                                                    382/118
7,117,370 B2 * 10/2006 Khan ..................... H04L 51/24
                                                    713/186

(Continued)

OTHER PUBLICATIONS

S. Barra, M. De Marsico, C. Galdi, D. Riccio and H. Wechsler, "FAME: Face Authentication for Mobile Encounter," 2013 IEEE Workshop on Biometric Measurements and Systems for Security and Medical Applications, Naples, 2013, pp. 1-7. (Year: 2013).*

(Continued)

*Primary Examiner* — Ashford S Hayles
(74) *Attorney, Agent, or Firm* — Elliot H. Karlin; Hickman Palermo Becker Bingham LLP (57) ABSTRACT

Techniques for using a graphical user interface to automatically generate expense lines from images are described herein. According to an embodiment, a server computer causes storing in a data repository, data identifying a plurality of users, the data comprising feature data extracted from one or more images of the users. The server computer receives a digital photographic image captured using a camera in a mobile computing device. The server computer identifies one or more faces in the digital photographic image and determines that the one or more faces in the digital photographic image match a particular user. The server computer generates and stores an expense line in an expense data table in the data repository, the expense line comprising an identification of the particular user.

18 Claims, 8 Drawing Sheets

(51) Int. Cl.
*G06K 9/00* (2006.01)
*G06K 9/62* (2006.01)
*G06F 3/0482* (2013.01)
(52) U.S. Cl.
CPC ....... *G06K 9/6201* (2013.01); *G06Q 30/0283* (2013.01); *G06F 3/0482* (2013.01)

(56) References Cited

U.S. PATENT DOCUMENTS

| | | | | |
|---|---|---|---|---|
| 9,881,295 | B1* | 1/2018 | Buddhavarapu | G06Q 20/3274 |
| 9,978,052 | B2* | 5/2018 | Zhao | G06Q 20/3224 |
| 10,095,917 | B2* | 10/2018 | Taigman | G06N 3/0454 |
| 10,402,627 | B2* | 9/2019 | Ju | G06K 9/00288 |
| 10,579,785 | B2* | 3/2020 | Beacham | H04L 9/3231 |
| 10,601,821 | B2* | 3/2020 | Du | G06F 21/45 |
| 2012/0158582 | A1* | 6/2012 | Nuzzi | G06Q 20/10 |
| | | | | 705/40 |
| 2012/0267432 | A1* | 10/2012 | Kuttuva | G06Q 20/223 |
| | | | | 235/379 |
| 2013/0218757 | A1* | 8/2013 | Ramanathan | G06Q 20/385 |
| | | | | 705/39 |
| 2014/0067631 | A1* | 3/2014 | Dhuse | G06Q 40/10 |
| | | | | 705/30 |
| 2014/0156517 | A1* | 6/2014 | Argue | G07G 1/0081 |
| | | | | 705/40 |
| 2014/0258838 | A1* | 9/2014 | Evers | G06Q 40/12 |
| | | | | 715/234 |
| 2014/0328521 | A1* | 11/2014 | Colangelo | H04L 67/18 |
| | | | | 382/118 |
| 2015/0095228 | A1* | 4/2015 | Su | G06O 20/12 |
| | | | | 705/44 |
| 2015/0348045 | A1* | 12/2015 | Agarwal | G06K 9/00248 |
| | | | | 705/44 |
| 2016/0125383 | A1* | 5/2016 | Chan | G06Q 20/3224 |
| | | | | 705/39 |
| 2016/0132670 | A1* | 5/2016 | Salama | G06F 21/32 |
| | | | | 726/19 |
| 2016/0269379 | A1* | 9/2016 | Livesay | G06K 9/00288 |
| 2017/0124540 | A1* | 5/2017 | Chan | G06Q 20/3224 |
| 2017/0228584 | A1* | 8/2017 | Studnicka | H04W 76/14 |
| 2019/0043030 | A1* | 2/2019 | Wang | G06F 3/04842 |

OTHER PUBLICATIONS

Authors et. al.: Disclosed Anonymously, "Method and Apparatus for Mobile Identity Authentication" An IP.com Prior Art Database Technical Disclosure, Mar. 29, 2010 (Year: 2010).*

J Christopher Westland; Theordore H. Clark, "Secure Digital Payments," in Global Electronic Commerce: Theory and Case Studies, MITP, 1999, pp. 465-528 (Year: 1999).*

* cited by examiner

AUTOMATIC GENERATION OF EXPENSE DATA USING FACIAL RECOGNITION IN DIGITALLY CAPTURED PHOTOGRAPHIC IMAGES

FIELD OF THE DISCLOSURE

The present disclosure is in the technical field of configurable software platforms and platform interfaces. The disclosure also is in the technical field of image processing through facial recognition and the application of facial recognition to the automatic generation of data.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Enterprise management software provide businesses with software functionality for generating various types of reports, expenses, and data management. One specific functionality of enterprise management software that is extremely important to businesses is the ability to generate, manage, and approve expenses for different employees.

Expense software interfaces generally require manual input of information, such as costs associated with the expense and specific information for each employee associated with the expense, such as the employee's name, title, company, and other information to justify the expense. With large meetings, such as business meals with clients, the amount of data that has to be manually entered increases with each employee that joins the meeting, making the generation of expense lines difficult and tedious.

Because of the difficulties generating such expenses using modern systems, expense generation tends to be a slow process that is not always performed properly. While intuitive interfaces may make the generation of expense lines slightly easier, the process of using an interface which requires manual input of each person associated with an expense can still be time consuming using modern systems.

Thus, there is a need for an improvement to computing systems that are used as a tool for generating expenses that reduce the time and effort required to use the computing system to generate expenses.

SUMMARY

The appended claims may serve to summarize the disclosure.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Embodiments are described in sections below according to the following outline:

General Overview
Structural Overview
Automatic Expense Line Generation
Example Graphical User Interface Implementation
Benefits of Certain Embodiments
Implementation Example—Hardware Overview
General Overview Techniques for automatically generating expense are described herein. In an embodiment, an expense server computer receives digital images captured from a client computing device and sends them to an external server computer. The external server computer extracts feature data from the image and compares the extracted feature data to stored feature data. The external server computer identifies matching feature data and sends an identifier associated with the matched feature data to the expense server computer. The expense server computer, external server computer, and/or client computing device matches the received identifiers to user profiles which contain data regarding the individual users, such as name, position, and company. The expense server computer then generates an expense line which includes information extracted from the user profile.

In an embodiment, a method comprises causing storing, in a data repository, data identifying a plurality of users, the data comprising feature data extracted from one or more images of the users; receiving a digital photographic image captured using a camera in a mobile computing device; using digitally programmed logic, identifying one or more faces in the digital photographic image; determining that the one or more faces in the digital photographic image match a particular user; generating and storing an expense line in an expense data table in the data repository, the expense line comprising an identification of the particular user.

Structural Overview

Figure 1:
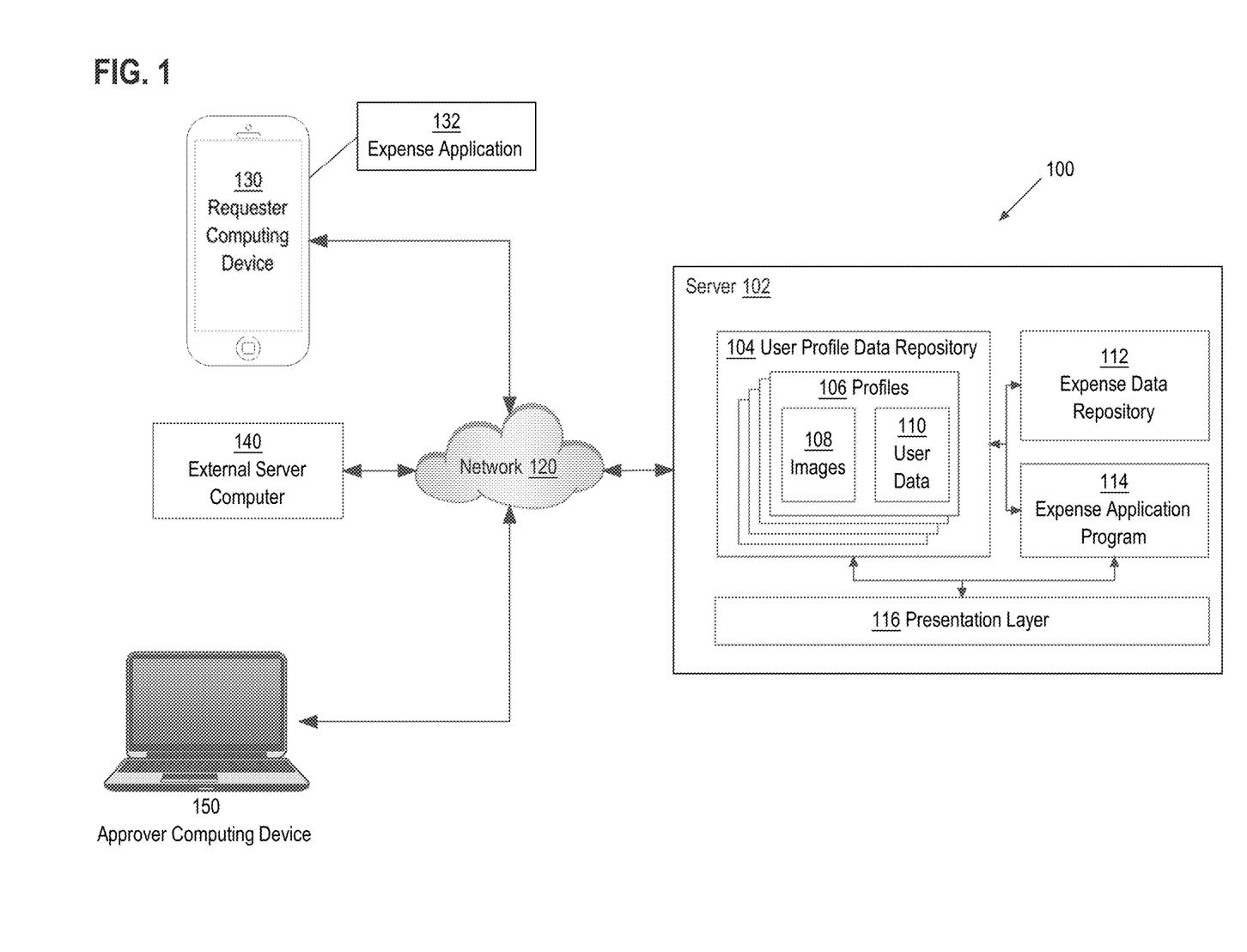
FIG. 1 is a block diagram of an example computer network system in which various embodiments may be practiced.

FIG. 1 is a block diagram of an example computer network system in which various embodiments may be practiced. FIG. 1 is shown in simplified, schematic format for purposes of illustrating a clear example and other embodiments may include other elements.

In an embodiment, a networked computer system 100 comprises a server computer ("server" for short) 102, requester computing device 130, approver computing device 150, and an external data source 140, which are communicatively coupled directly or indirectly via network 120. The server 100, requester computing device 130, approver computing device 150, external data source 140, and other elements of the system may each comprise an interface compatible with the network 120 and are programmed or configured to use standardized protocols for communication across the networks such as TCP/IP, Bluetooth, and higher-layer protocols such as HTTP, TLS, and the like.

Server 100 may be implemented using a server-class computer or other computers having one or more processor cores, co-processors, or other computers. Server 100 may be a physical server computer and/or a virtual server instance stored in a data center, such as through cloud computing.

In an embodiment, the server computer 102 executes an expense application program. The expense application program may comprise computer-readable instructions which are used to generate expense lines in an expense data repository and/or communicate with one or more external computing devices such as requester computing device 130 and approver computing device 150 to generate expense lines and/or approve generated expense lines.

The server 102 may generate and transmit alerts, notifications, expense approval requests and other information generated by the expense application program over the network 120 via the presentation layer 116.

Server 102 may comprise user profile data repository. User profile data repository comprises data regarding one or more profiles for users of the expense application program 114. In an embodiment, profiles 106 contain tenant data identifying a group to which the profiles correspond. For example, tenant data may define an entity, such as a business, to which the users of the profiles belong.

Profiles 106 may additionally include images 108 and user data 110. Images 108 may be supplied by the users of the system, such as through a client computing device over network 120. User data 110 contains additional information regarding the user, such as the user's name, title, company, role, and/or other user related data. Additionally, user data 110 may include external identifiers of the user profile, such as identifiers generated by an external server computer 140 which does not name the user associated with profiles 106. While FIG. 1 depicts images stored with the user profiles 106, in other embodiments, images are sent directly to external server computer 140 without being stored on user profile data repository 104.

Server 102 additionally includes an expense data repository 112. Expense data repository 112 may include expense data for one or more tenants or entities. The expense data may be stored in a logical format, such as a relational database, flat file, table, spreadsheet, or any other form of collective data storage that is capable of programmatic interrogation, such as using a query or API call, to obtain a result set of one or more records or datasets.

Additional computing elements, code or other functional elements that are not shown in FIG. 1 may be provided by the expense application program 114.

The computing devices such as the requester computing device 130 and approver computing device 150 may comprise a desktop computer, laptop computer, tablet computer, smartphone, or any other type of computing device that allows access to the server 102. Requester computing device 130 executes a client-side expense application 132 which is compatible with the server-side expense application 114. The client-side application 132 may communicate with the server-side expense application over network 120 through HTTP and/or other internet protocols. The client-side expense application 132 may be programmed or configured to send and receive data to the client-side expense application and display notifications and/or received data within the client-side expense application 132.

The external data source 140 may be accessed via network 120 by the server 102. The external data source 140 may comprise feature extraction instructions which, when executed by one or more processors of external server computer 140, cause the external server computer 140 to extract features from one or more images. The external server computer 140 may store the extracted features identification data, such as a token used to describe a user to which the extracted features correspond. The external server computer 140 may additionally compare extracted features from an image to stored extracted features to identify one or more matches between a received image and features extracted from previously received images.

The presentation layer 116 may be programmed or configured for generating electronic pages, alerts, notifications, hyperlinks, recommendations, or application protocol messages to output to the computing devices such as the requester computing device 130 and approver computing device 150. For example, the presentation layer 104 may be programmed to generate dynamic web pages that implement an application as a software-as-a-service (SaaS) application that the requester computing device 130 and approver computing device 150 accesses using a web browser hosted at the computing device.

Computer executable instructions described herein may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. In another embodiment, the programmed instructions also may represent one or more files or projects of source code that are digitally stored in a mass storage device such as non-volatile RAM or disk storage, in the systems of FIG. 1 or a separate repository system, which when compiled or interpreted cause generating executable instructions which when executed cause the computer to perform the functions or operations that are described herein with reference to those instructions. In other words, the drawing figure may represent the manner in which programmers or software developers organize and arrange source code for later compilation into an executable, or interpretation into bytecode or the equivalent, for execution by the server 102.

Network 120 may be implemented by any medium or mechanism that provides for the exchange of data between the various elements of FIG. 1. Examples of network 120 include, without limitation, a cellular network, communicatively coupled with a data connection to the computing devices over a cellular antenna, one or more Local Area Networks (LANs), one or more Wide Area Networks (WANs), one or more Ethernets or the Internet, or one or more terrestrial, satellite or wireless links, or a combination thereof. For purposes of illustrating a clear example, network 120 is shown as a single element but in practice, network 120 may comprise one or more local area networks, wide area networks, and/or internetworks. The various elements of FIG. 1 may also have direct (wired or wireless) communications links, depending upon a particular implementation.

Automatic Expense Line Generation

Figure 2:
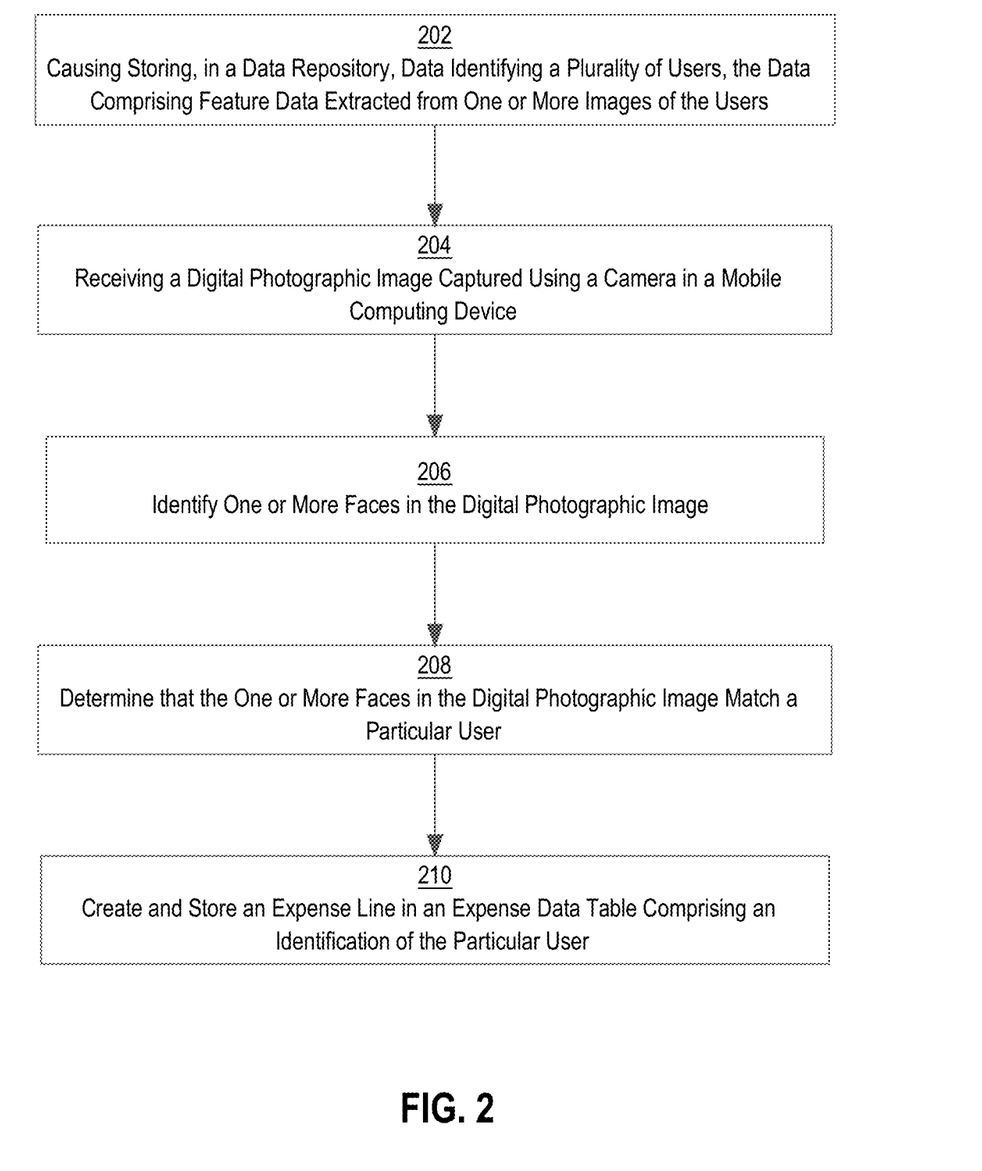
FIG. 2 depicts a method for automatically generating expense lines in an expense table using images.

FIG. 2 depicts a method for automatically generating expense lines in an expense table using images.

At step 202, data identifying a plurality of users is caused to be stored in a data repository, the data comprising feature data extracted from one or more images of the users. For example, an expense server computer such as server 102 may receive images from one or more client computing devices. The expense server computer may send the images to an external server computer for performing facial recognition. For example, the expense server computer may communicate with a facial recognition application programming interface (API) of the external server computer 140 to send images for feature extraction.

The external computing device may extract features from the image using image processing techniques and store the extracted features. Features, in an embodiment, comprise digital data representing geometric or photometric elements of a digital image that have been detected and that are capable of contributing to recognition of a face; examples include landmarks from an image of the subject's face such as the relative position, size, and/or shape of the eyes, nose, cheekbones, and jaw. In an embodiment, the external computing device may be configured to discard the received images after the features have been extracted, without storing the received images, and thus only store feature data. Feature data may be encrypted or compressed for efficiency or privacy.

The expense server computer may send images to the external server computer with data identifying a user account with which the images are to be associated. For example, a client computing device may send an image associated with a first user account to the expense server computer. The expense server computer may identify a user profile associated with the first user account. The expense server computer may send to the external server computer the image as well as data from the user profile identifying the user account. The data may include the user account's name and/or one or more identifiers generated by the expense server computer to be associated with the user account's name, such as a random multiple digit value that was generated for the user account profile. The expense server computer may additionally send a tenant identifier which identifies a grouping of user account profiles to which the user account profile belongs.

The external server computer may store extracted features from images with corresponding identifiers either generated by the expense server computer or the external server computer. For example, the external server computer may receive a first image without a user identifier. The external server computer may extract the features and generate a new user identifier which the external server computer communicates to the expense server computer. When the external server computer receives a new image along with an identifier generated by the external server computer, the external server computer may extract the features from the image and store the extracted features with the received identifier.

In this manner, the external server computer may perform the facial recognition described herein without maintaining either images of users or names of users. Instead, the external server computer may store extracted feature data and unique user identifiers. In an embodiment, the external server computer additionally stores unique tenant identifiers that further define a grouping of the user identifiers to be considered.

At step 204, a digital photographic image captured using a camera in a mobile computing device is received. For example, a client computing device may send a request to the expense server computer to generate an expense line using facial recognition from an image. An application executing on the client computing device may prompt a user to capture an image using the camera of the client computing device. After an image has been captured by the client computing device, the client computing device may send the image to the expense server computer. Additionally or alternatively, the client computing device may send an image that was previously stored on the client computing device.

At step 206, one or more faces are identified in the digital photographic image. For example, the expense server computer may send the digital photographic image to the external server computer. The external server computer may use facial recognition software to identify faces in the digital photographic image and to extract facial features from the digital photographic image. The external server computer may compare the extracted facial features with stored facial features of a plurality of users. If the external server computer is able to match the extracted facial features with stored facial features, the external server computer may send an identifier associated with the stored facial features to the expense server computer. If the external server computer is unable to match extracted facial features, the external server computer may send data to the expense server computer indicating that no match was identified.

In an embodiment, a determination that the image contains one or more faces is made at the client computing device. For example, a software library executing on the client computing device may include instructions for identifying whether an image includes a face without performing the facial matching. For example, MOBILE VISION, provided by GOOGLE comprises an API for identifying faces in images. The client computing device may determine whether an image contains one or more faces before sending the image to the expense server computer and/or external server computer.

In an embodiment, the expense server computer uses tenant identifiers to limit the scope of extracted features to which the digital photographic image is compared. For example, the expense server computer may initially send images to the external server computer with identifiers for the individual faces in the images and tenant identifiers which represent a group of to which the individuals belong. When the expense server computer sends an image to the external server computer for face recognition, the expense server computer may provide a tenant identifier to cause the external server computer to limit the comparison of features from the sent image to only extracted features from images that were sent with the same tenant identifier.

As a practical example, the expense server computer may send a first plurality of images to the external server computer that includes identifiers of User 1 and User 2 in the image and an identifier of Entity 1 for the image. The expense server computer may send a second plurality of images to the external server computer that includes identifiers of User 3 and User 4 in the image and an identifier of Entity 2. When the expense server computer receives an image from a user of Entity 1, the expense server computer may send the image to the external server computer with the identifier of Entity 1. The external server computer may then compare features from the image to the features from the first plurality of images and not the second plurality of images. Thus, the external server computer would only match the image to the identifiers of User 1 and User 2 and not to the identifiers of User 3 or User 4.

At step 208, a determination is made that one or more faces in the digital photographic image match a particular user. For example, the expense server computer may identify one or more faces in the digital photographic image in response to receiving data from the external server computer indicating that the external server computer matched extracted facial features from the digital photographic image with stored facial features. The expense server computer may then match identifiers received from the external server computer with profiles of users. For example, the expense server computer may identify user profiles that comprise matching identifiers.

At step 210, an expense line comprising an identification of the particular user is created and stored in an expense data table. For example, the expense server computer may generate expense lines for each user identified by the external server computer. Thus, if the external server computer sends the expense server computer identifiers that the expense server matches to User 1 and User 2, the expense server computer may generate an expense line for User 1 and an expense line for User 2. The expense server computer may additionally request verification from the client computing device that the identified users correspond to the users in the image. If verification is received, the expense server computer may send the verification to the external server computer to cause the external server computer to update stored facial feature data for the users with the facial feature data extracted from the image.

If a face is identified, but the external server computer is unable to identify a match, the external server computer may send data to the expense server computer identifying the location of the face in the image and specifying that a match was not found. The expense server computer may indicate to the client computing device that a match was not found for the face in the image. The expense server computer may cause the client computing device to display options for identifying the user account associated with the face.

If the client computing device sends data identifying a user of whom the external server computer stores facial feature data, the expense server computer may send data to the external server computer with the identifier of the user account. The external server computer may then update the stored facial feature data for the user account with the facial feature data from the image. If images of the user have not been provided to the external server computer in the past, the expense server computer may indicate to the external server computer that the face belongs to a new user account. In response, the external server computer may generate a new identifier and store the extracted facial features for the new user account with the identifier.

Example Graphical User Interface Implementation

In an embodiment, an expense server computer such as server 102 causes generating a graphical user interface for display on the client computing device and programmed for generating expense lines using images captured from the client computing device. The expense server computer may use the graphical user interface to request images from the client computing device, to display identified users for verification, to request data on unidentified users in captured images, and to display options for generating expense lines. The client computing device may execute the graphical user interface through an application provided by the expense server computer executing on the client computing device. FIGS. 3-7 depict example graphical user interfaces executing on the client computing device.

Figure 3:
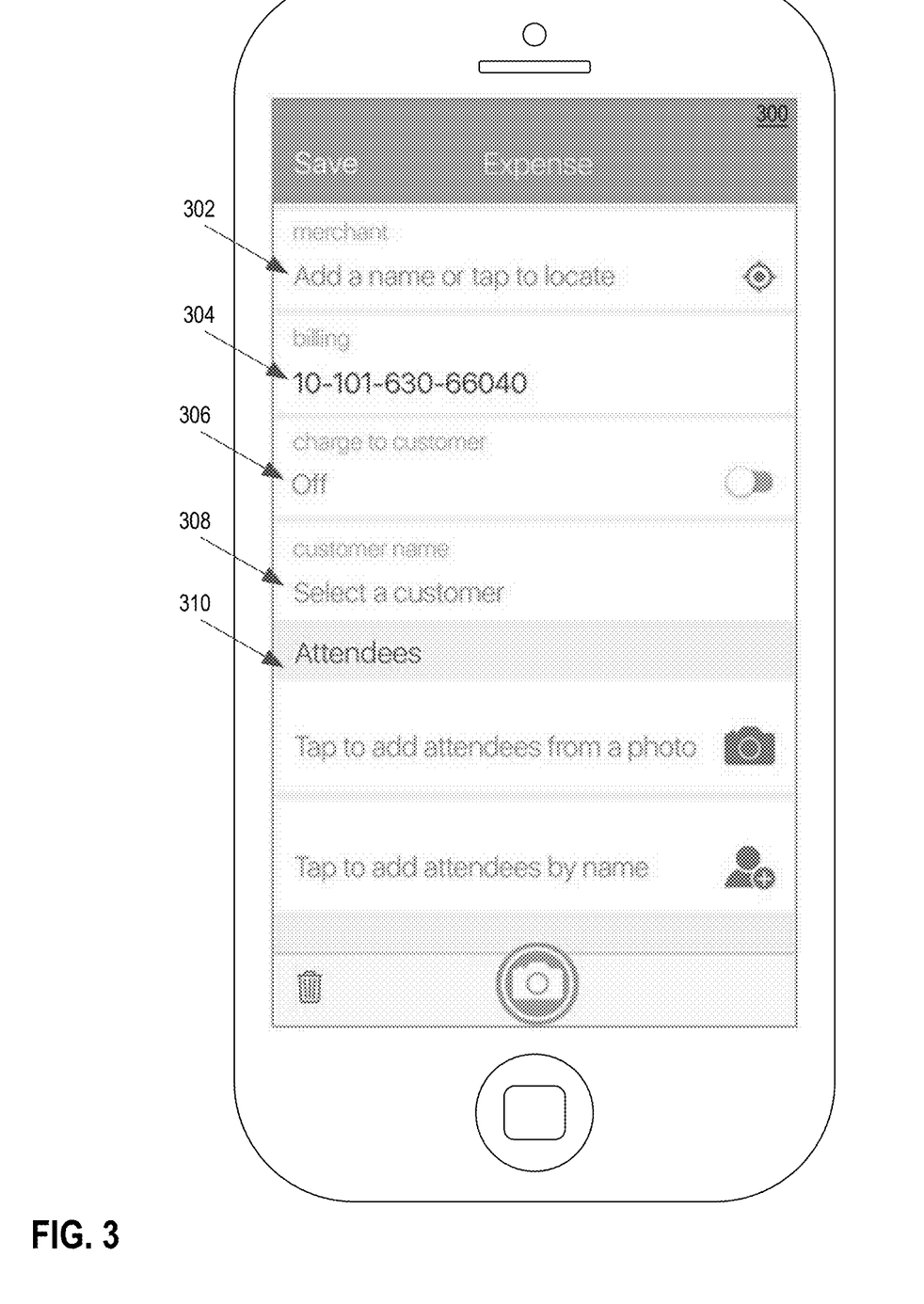
FIG. 3 depicts an example graphical user interface for generating expense lines using images from a client computing device.

FIG. 3 depicts an example graphical user interface for generating expense lines using images from a client computing device. The client computing device may generate and cause displaying the interface of FIG. 3 in response to input requesting the generation of a new expense. For example, an expense application may comprise a selectable option stating "generate new expense" which, when selected causes display of the interface of FIG. 3.

In an embodiment, interface 300 comprises GUI widgets that are programmed to accept input for defining an expense line or expense record. In an embodiment, interface 300 comprises a merchant widget 302 that is programmed to accept text input to identify a merchant. In some embodiments, entering text data in merchant widget 302 causes the expense application program 132 to transmit a request to the server-side application 114 to search the data repository for matching merchant names and to display a list of merchant names in the widget 302. The correct merchant name can be selected from the list. Alternatively, input expressing a tap on the widget 302 may cause the expense application program 132 to display a map that identifies geographically nearby merchants based upon GPS location data that the user computing device 130 transmits to the server 102.

In an embodiment, interface 300 comprises a billing widget 304 that is programmed to accept text input identifying a billing code for an expense. Additionally or alternatively, billing widget 304 may accept text input to identify a type of billing. In some embodiments, entering text data in billing widget 304 causes the expense application program 132 to transmit a request to the server-side application 114 to search the data repository for billing types and to display a list of billing types in the widget 304. The correct billing type can be selected from the list. In response to a selection of the correct billing type, the expense application program 132 may identify a corresponding billing code and select the corresponding billing code for widget 304.

In an embodiment, interface 300 comprises a customer billing widget 306 that is programed to accept selection input indicating whether an expense is to be billed to a customer. In response to a selection of the widget 306, the widget 306 may display data indicating that the expense is to be billed to the customer. Additionally, the system may require input and/or identification of a customer, such as through customer widget 308.

In an embodiment, interface 300 comprises a customer widget 308 that is programmed to accept text input to identify a customer. In some embodiments, entering text data in customer widget 308 causes the expense application program 132 to transmit a request to the server-side application 114 to search the data repository for matching customer names and to display a list of customer names in the widget 308. The correct customer name can be selected from the list.

In an embodiment, interface 300 comprises an attendee adding widget 310 with an option to add attendees by name and an option to add attendees by photograph. The option to add attendees by name may be programmed to accept text input to identify attendees. In some embodiments, entering text data in the option to add attendees by name causes the expense application program 132 to transmit a request to the server-side application 114 to search the data repository for user profiles associated with a tenant identifier of the client computing device and display the user names in the widget 310. The correct customer name can be selected from the list. The list of selectable users for adding manually may be initially populated with users that have been recently added to expense requests.

While FIG. 3 depicts specific options for adding participants based on images, in an embodiment the graphical user interface includes an option for adding an image to an expense. When the client computing device receives the image, the client computing device may determine whether the image contains a face, such as by using a facial identification software library executing on the client computing device. If the client computing device determines that the image does not contain a face, the client computing device may store the image and/or send the image to the expense server computer for storage with the expense line. If the client computing device determines that the image does contain a face, the client computing device may send the image to the expense server computer and/or the external server computer for facial matching.

Figure 4:
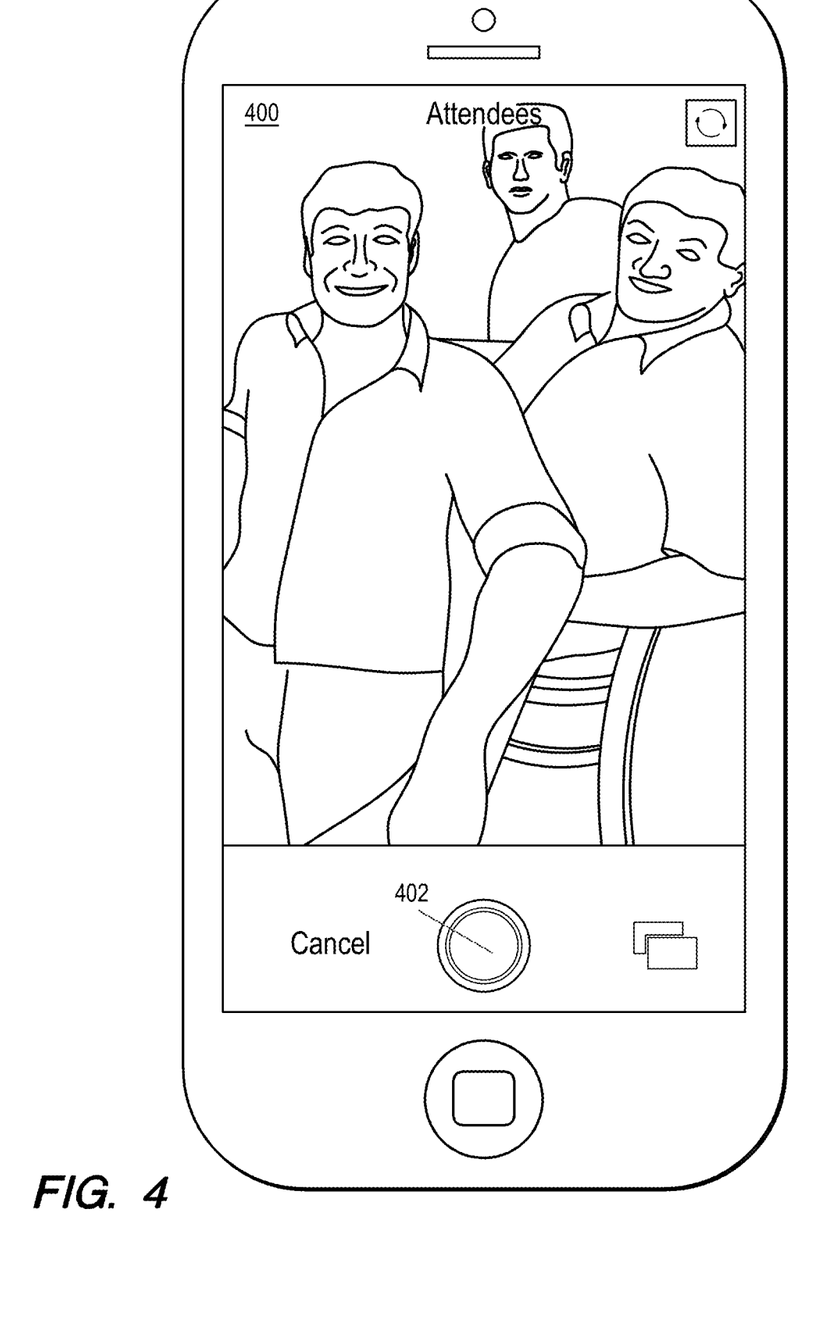
FIG. 4 depicts an example graphical user interface depicting a capture display on a client computing device.

In response to a selection of the option to add attendees from a photo, the client computing device may display an interface for capturing a photograph. FIG. 4 depicts an example graphical user interface depicting a capture display on a client computing device. Interface 400 may display a sample of a captured image, thereby allowing a user of the client computing device to position the camera of the client computing device to capture the faces of the attendees. In an embodiment, the client computing device detects locations of faces prior to capture of the image, such as by using facial identification software. The display may highlight identified faces, thereby allowing the user to reposition the camera in order to identify all faces prior to capture. Interface 400 comprises capture widget 402 which, when selected, causes the client computing device to capture an image through the camera of the client computing device.

Figure 5:
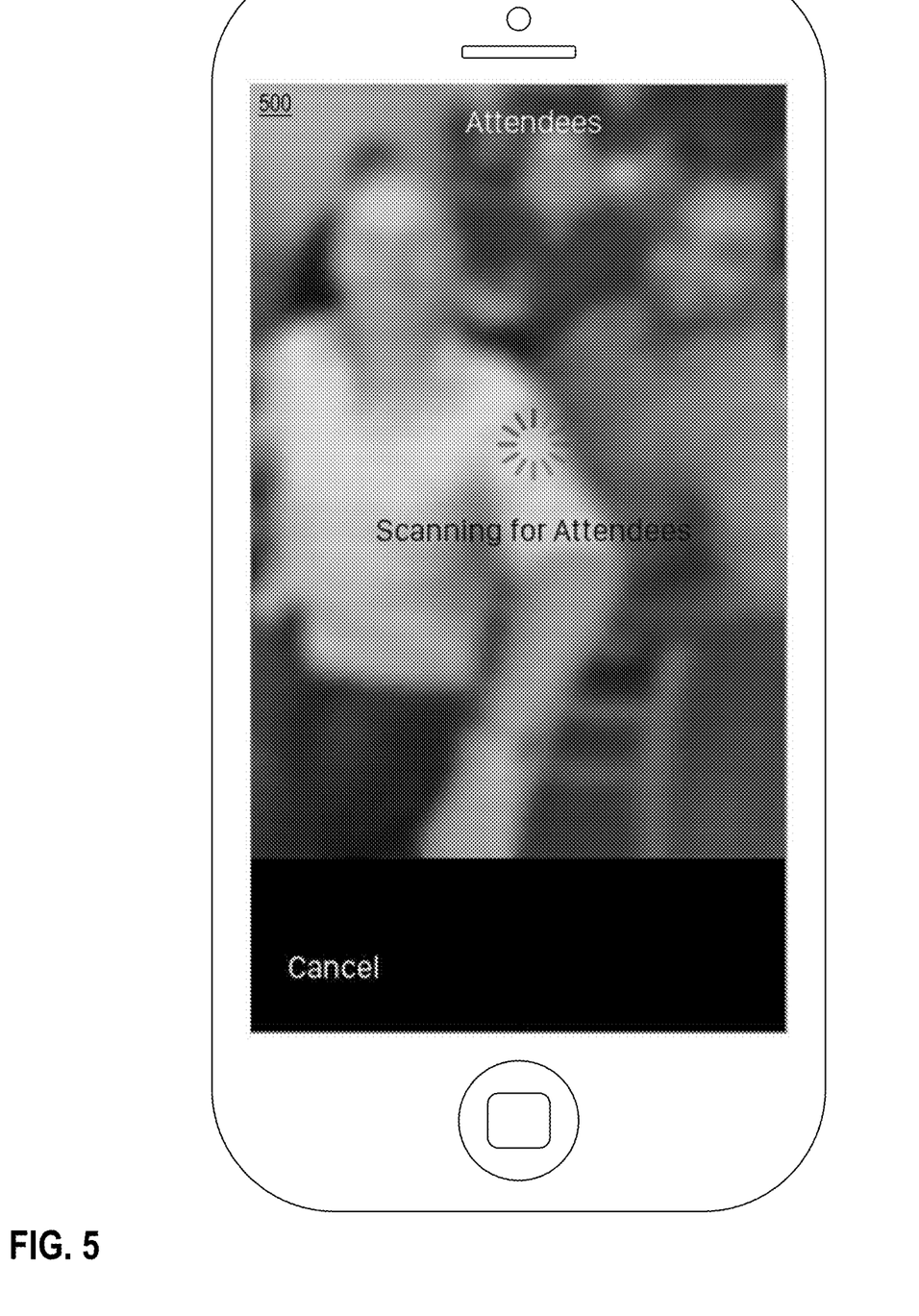
FIG. 5 depicts an example graphical user interface depicting a scan of a captured image on a client computing device.

FIG. 5 depicts an example graphical user interface depicting a scan of a captured image on a client computing device. Interface 500 is an interstitial display that may be displayed while the expense server computer communicates with the external server computer to perform facial recognition on the image captured using the interface of FIG. 4.

Figure 6:
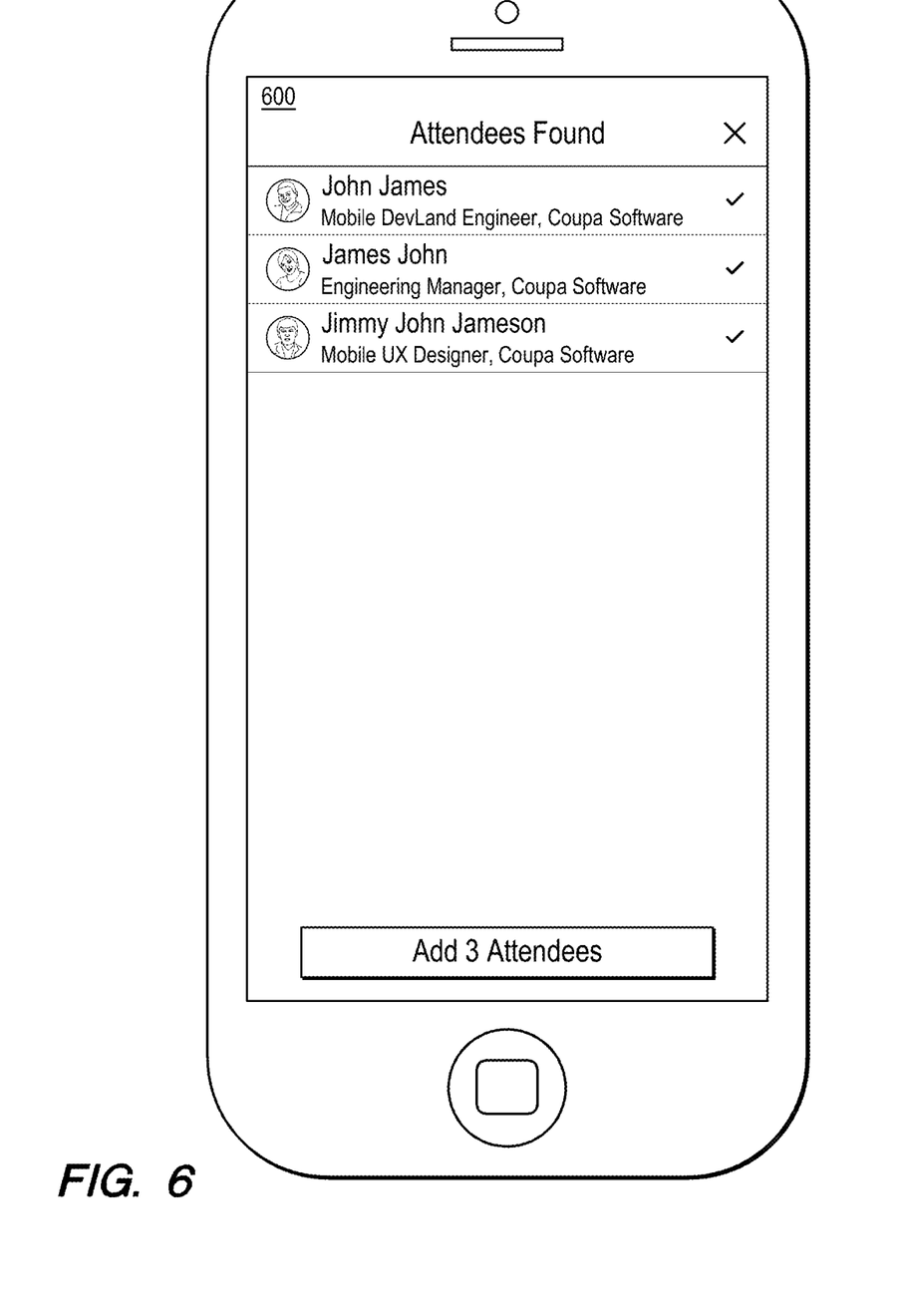
FIG. 6 depicts an example graphical user interface depicting one or more identified users through the graphical user interface.

FIG. 6 depicts an example graphical user interface depicting one or more identified users through the graphical user interface. Interface 600 displays profile pictures and names for the users identified through the facial recognition performed by the external server computer. The external server computer may send the profile pictures and names of the users to the client computing device in response to receiving the identification from the external server computer.

Interface 600 may accept input modifying the identified attendees. For example, interface 600 may include an option for deselecting identified individual in order to not include the identified individuals in the expense line. Additionally or alternatively, in response to a selection of an individual, the application may display options for editing the selection. For example, the user may edit name, title, or other profile information for the selected users and/or replace the selected user with an identifier of a different user profile stored in the system and/or an identifier of a person not known to the system. When an identified user is replaced, the expense server computer may update the external server computer to indicate that the facial features in the image should have matched the updated user instead of the initially selected user.

In an embodiment, the graphical user interface may additionally indicate that a face was unable to be matched by the external server computer. For example, interface 600 may display a portion of the image with the unmatched face with text indicating that the face was not matched. In response to a selection of the unmatched face and/or corresponding text, the application may display an interface for identifying the user. The interface may include options for adding a new user to the system, adding a new user to not be stored in the system, identifying the face as belonging to an existing user in the system, deleting the entry, and/or indicating that the entry is not a face. If a new user is added, an existing user is identified, and/or data indicating that the entry is not a face is received, the expense server computer may update the external server computer with the user selected for the face.

Figure 7:
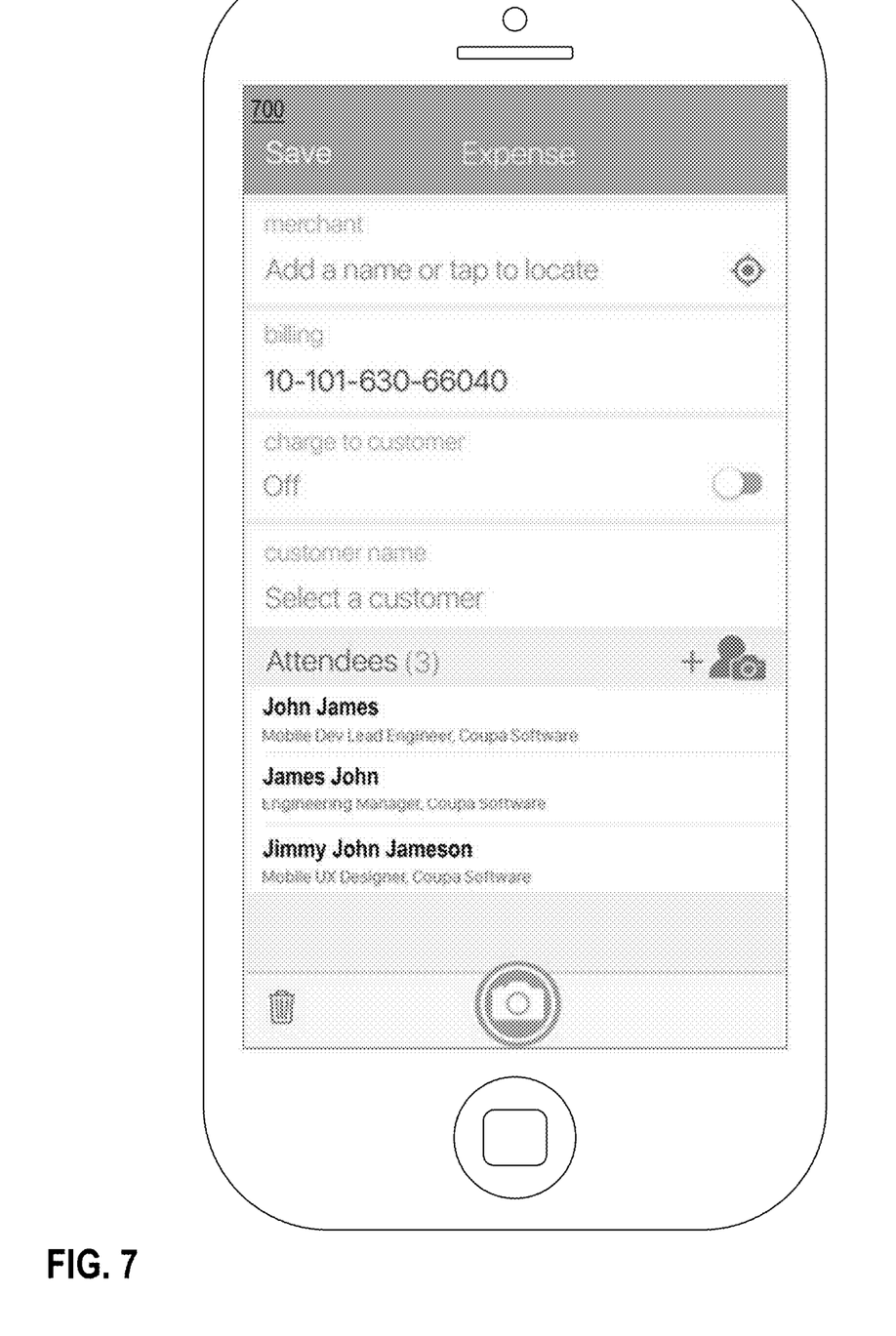
FIG. 7 depicts an example graphical user interface for completing expense lines with users identified through images from a client computing device.

FIG. 7 depicts an example graphical user interface for completing expense lines with users identified through images from a client computing device. In FIG. 7, the attendees option includes the identifiers of the users selected from the prior steps. When the user selects the option to save the expense report, the expense server computer may generate the expense lines for the identified attendees.

The interface may additionally include options for adding additional users manually and/or for adding additional users through a subsequent image. The list of selectable users for adding manually may be initially populated with users that have been recently added to expense requests. Thus, the system can be scalable and/or implementable for large numbers of users and/or users that were not identified due to poor photo quality.

In an embodiment, the expense server computer automatically generates the expense line based on one or more additional data points. For example, the expense server computer may store an expense rate for each user. If the expense server computer receives input identifying a length of the meeting, the expense server computer may additionally compute an expense amount for each attendee based on the stored expense rate and the length of the meeting. Additionally and/or alternatively, a total cost amount may be input through the graphical user interface.

In an embodiment, the graphical user interface additionally includes options for adding costs using the camera function. For example, an option may allow users to take a picture of a receipt for expensing. The expense server computer or an external server computer may use optical character recognition techniques to identify a total amount on the receipt to expense for the identified attendees.

In an embodiment, expenses created using the application executing on the client computing device may be sent to an approver computing device for approval. The expense may be accompanied with the image used to identify the attendees at the meeting, thereby adding authenticity to the expense request. If the approving computing device sends data approving the expense, the expense lines may be stored as approved expense lines by the expense server computer. While the approving computing device may display options for approving and viewing attendees, the expense server computer may limit the approving device from adding, deleting, or editing identified attendees.

Benefits of Certain Embodiments

Embodiments described herein provide improvements to graphical user interfaces for generating expense lines. The methods described herein use facial recognition software to improve the use of the graphical user input by decreasing the number of steps that must be performed to generate an expense line. By implementing an image based generation of expense lines, the systems and methods described herein decrease the amount of time that is spent to create an expense report, the processing required of the client computing device to generate expense lines, and the effort that must be expended to produce the expense lines. Thus, the systems and methods described herein provide a specific improvement to graphical user interfaces as well as to computing devices that are used for generating expense lines.

Implementation Example—Hardware Overview

According to one embodiment, the techniques described herein are implemented by at least one computing device.

The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 8:
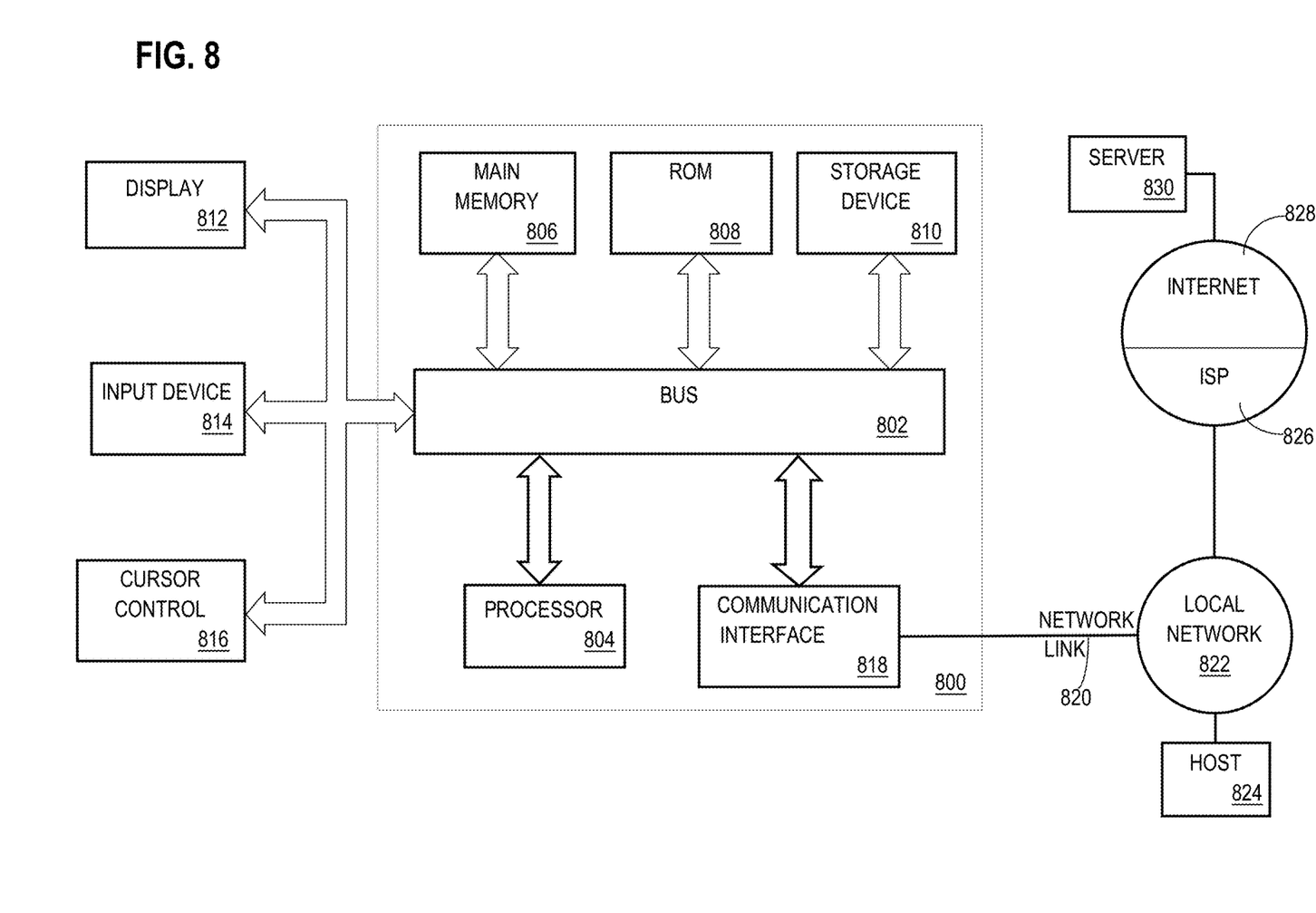
FIG. 8 is a block diagram that illustrates an example computer system with which an embodiment may be implemented.

FIG. 8 is a block diagram that illustrates an example computer system with which an embodiment may be implemented. In the example of FIG. 8, a computer system 800 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 800 includes an input/output (I/O) subsystem 802 which may include a bus and/or other communication mechanism(s) for communicating information and/or instructions between the components of the computer system 800 over electronic signal paths. The I/O subsystem 802 may include an I/O controller, a memory controller and at least one I/O port. The electronic signal paths are represented schematically in the drawings, for example as lines, unidirectional arrows, or bidirectional arrows.

At least one hardware processor 804 is coupled to I/O subsystem 802 for processing information and instructions. Hardware processor 804 may include, for example, a general-purpose microprocessor or microcontroller and/or a special-purpose microprocessor such as an embedded system or a graphics processing unit (GPU) or a digital signal processor or ARM processor. Processor 804 may comprise an integrated arithmetic logic unit (ALU) or may be coupled to a separate ALU.

Computer system 800 includes one or more units of memory 806, such as a main memory, which is coupled to I/O subsystem 802 for electronically digitally storing data and instructions to be executed by processor 804. Memory 806 may include volatile memory such as various forms of random-access memory (RAM) or other dynamic storage device. Memory 806 also may be used for storing temporary variables or other intermediate information during execution of instructions to be executed by processor 804. Such instructions, when stored in non-transitory computer-readable storage media accessible to processor 804, can render computer system 800 into a special-purpose machine that is customized to perform the operations specified in the instructions.

Computer system 800 further includes non-volatile memory such as read only memory (ROM) 808 or other static storage device coupled to I/O subsystem 802 for storing information and instructions for processor 804. The ROM 808 may include various forms of programmable ROM (PROM) such as erasable PROM (EPROM) or electrically erasable PROM (EEPROM). A unit of persistent storage 810 may include various forms of non-volatile RAM (NVRAM), such as FLASH memory, or solid-state storage, magnetic disk or optical disk such as CD-ROM or DVD-ROM, and may be coupled to I/O subsystem 802 for storing information and instructions. Storage 810 is an example of a non-transitory computer-readable medium that may be used to store instructions and data which when executed by the processor 804 cause performing computer-implemented methods to execute the techniques herein.

The instructions in memory 806, ROM 808 or storage 810 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 800 may be coupled via I/O subsystem 802 to at least one output device 812. In one embodiment, output device 812 is a digital computer display. Examples of a display that may be used in various embodiments include a touch screen display or a light-emitting diode (LED) display or a liquid crystal display (LCD) or an e-paper display. Computer system 800 may include other type(s) of output devices 812, alternatively or in addition to a display device. Examples of other output devices 812 include printers, ticket printers, plotters, projectors, sound cards or video cards, speakers, buzzers or piezoelectric devices or other audible devices, lamps or LED or LCD indicators, haptic devices, actuators or servos.

At least one input device 814 is coupled to I/O subsystem 802 for communicating signals, data, command selections or gestures to processor 804. Examples of input devices 814 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 816, which may perform cursor control or other automated control functions such as navigation in a graphical interface on a display screen, alternatively or in addition to input functions. Control device 816 may be a touchpad, a mouse, a trackball, or cursor direction keys for communicating direction information and command selections to processor 804 and for controlling cursor movement on display 812. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 814 may include a combination of multiple different input devices, such as a video camera and a depth sensor.

In another embodiment, computer system 800 may comprise an internet of things (IoT) device in which one or more of the output device 812, input device 814, and control device 816 are omitted. Or, in such an embodiment, the input device 814 may comprise one or more cameras, motion detectors, thermometers, microphones, seismic detectors, other sensors or detectors, measurement devices or encoders and the output device 812 may comprise a special-purpose display such as a single-line LED or LCD display, one or more indicators, a display panel, a meter, a valve, a solenoid, an actuator or a servo.

When computer system 800 is a mobile computing device, input device 814 may comprise a global positioning system (GPS) receiver coupled to a GPS module that is capable of triangulating to a plurality of GPS satellites, determining and generating geo-location or position data such as latitude-longitude values for a geophysical location of the computer system 800. Output device 812 may include hardware, software, firmware and interfaces for generating position reporting packets, notifications, pulse or heartbeat signals, or other recurring data transmissions that specify a position of the computer system 800, alone or in combination with other application-specific data, directed toward host 824 or server 830.

Computer system 800 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 800 in response to processor 804 executing at least one sequence of at least one instruction contained in main memory 806. Such instructions may be read into main memory 806 from another storage medium, such as storage 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 810. Volatile media includes dynamic memory, such as memory 806. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 802. Transmission media can also take the form of acoustic or light waves, such as those generated during radio-wave and infra-red data communications.

Various forms of media may be involved in carrying at least one sequence of at least one instruction to processor 804 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 800 can receive the data on the communication link and convert the data to a format that can be read by computer system 800. For instance, a receiver such as a radio frequency antenna or an infrared detector can receive the data carried in a wireless or optical signal and appropriate circuitry can provide the data to I/O subsystem 802 such as place the data on a bus. I/O subsystem 802 carries the data to memory 806, from which processor 804 retrieves and executes the instructions. The instructions received by memory 806 may optionally be stored on storage 810 either before or after execution by processor 804.

Computer system 800 also includes a communication interface 818 coupled to bus 802. Communication interface 818 provides a two-way data communication coupling to network link(s) 820 that are directly or indirectly connected to at least one communication networks, such as a network 822 or a public or private cloud on the Internet. For example, communication interface 818 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 822 broadly represents a local area network (LAN), wide-area network (WAN), campus network, internetwork or any combination thereof. Communication interface 818 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 818 sends and receives electrical, electromagnetic or optical signals over signal paths that carry digital data streams representing various types of information.

Network link 820 typically provides electrical, electromagnetic, or optical data communication directly or through at least one network to other data devices, using, for example, satellite, cellular, Wi-Fi, or BLUETOOTH technology. For example, network link 820 may provide a connection through a network 822 to a host computer 824.

Furthermore, network link 820 may provide a connection through network 822 or to other computing devices via internetworking devices and/or computers that are operated by an Internet Service Provider (ISP) 826. ISP 826 provides data communication services through a world-wide packet data communication network represented as internet 828. A server computer 830 may be coupled to internet 828. Server 830 broadly represents any computer, data center, virtual machine or virtual computing instance with or without a hypervisor, or computer executing a containerized program system such as DOCKER or KUBERNETES. Server 830 may represent an electronic digital service that is implemented using more than one computer or instance and that is accessed and used by transmitting web services requests, uniform resource locator (URL) strings with parameters in HTTP payloads, API calls, app services calls, or other service calls. Computer system 800 and server 830 may form elements of a distributed computing system that includes other computers, a processing cluster, server farm or other organization of computers that cooperate to perform tasks or execute applications or services. Server 830 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 830 may comprise a web application server that hosts a presentation layer, application layer and data storage layer such as a relational database system using structured query language (SQL) or no SQL, an object store, a graph database, a flat file system or other data storage.

Computer system 800 can send messages and receive data and instructions, including program code, through the network(s), network link 820 and communication interface 818. In the Internet example, a server 830 might transmit a requested code for an application program through Internet 828, ISP 826, local network 822 and communication interface 818. The received code may be executed by processor 804 as it is received, and/or stored in storage 810, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 804. While each processor 804 or core of the processor executes a single task at a time, computer system 800 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:

1. A method comprising:

causing storing, in a data repository accessible by an external server computer, data identifying a plurality of users, the data comprising feature data extracted from one or more images of the users and corresponding unique identifiers;

storing, at an expense server computer, a plurality of user profiles, the plurality of user profiles comprising, for each of the plurality of users, information regarding the user and a corresponding unique identifier of the corresponding unique identifiers;

receiving, at the expense server computer, a digital photographic image captured using a camera in a mobile computing device;

using digitally programmed logic of the expense server computer, identifying one or more faces in the digital photographic image by sending the digital photographic image to the external server computer which compares features extracted from the digital photographic image to the feature data stored in the data repository and receiving one or more particular unique identifiers of the corresponding unique identifiers in response;

determining, at the expense server computer, that the one or more faces in the digital photographic image match a particular user by matching the one or more particular unique identifiers to one or more of the plurality of user profiles;

generating and storing an expense line in an expense data table at the expense server computer, the expense line comprising an identification of the particular user.

2. The method of claim 1, further comprising:

receiving a second digital photographic image captured using the camera in the mobile computing device;

identifying, in the second digital photographic image, a value indicating a total cost;

updating the expense line to include the total cost.

3. The method of claim 1, further comprising:

causing displaying the expense line on the mobile computing device;

receiving, from the mobile computing device, input selecting the identification of the particular user;

in response to receiving the input, removing the particular user from the expense line.

4. The method of claim 1, further comprising:

causing displaying the expense line on the mobile computing device with an option for adding new users to the expense line with a second digital image;

receiving a selection of the option;

in response to receiving the selection, causing displaying an interface for capturing a new digital photographic image;

receiving a second digital photographic image captured using the mobile computing device;

using digitally programmed logic, identifying one or more second faces in the second digital photographic image;

determining that the one or more second faces in the digital photographic image match a second user;

updating the expense line to comprise an identification of the second user.

5. The method of claim 1, further comprising:

causing displaying the expense line on the mobile computing device with an option for adding new users to the expense report through a search;

receiving a selection of the option;

causing displaying an editable text box for searching for additional users;

receiving textual input in the editable text box and, in response, searching the data repository for data identifying one or more users matching the textual input;

causing displaying data identifying the one or more users;

receiving a selection of a second user of the one or more users;

updating the expense line to comprise an identification of the second user.

6. The method of claim 1, further comprising:

causing displaying the expense line on the mobile computing device;

receiving a selection of the particular user on the expense line;

causing displaying one or more options for updating the data identifying the particular user;

receiving input selecting the one or more options and, in response, updating the data identifying the particular user in the expense line and in the data repository.

7. One or more non-transitory computer-readable media storing instructions which, when executed by one or more processors, cause performance of:

causing storing, in a data repository accessible by an external server computer, data identifying a plurality of users, the data comprising feature data extracted from one or more images of the users and corresponding unique identifiers;

storing, at an expense server computer, a plurality of user profiles, the plurality of user profiles comprising, for each of the plurality of users, information regarding the user and a corresponding unique identifier of the corresponding unique identifiers;

receiving, at the expense server computer, a digital photographic image captured using a camera in a mobile computing device;

using digitally programmed logic of the expense server computer, identifying one or more faces in the digital photographic image by sending the digital photographic image to the external server computer which compares features extracted from the digital photographic image to the feature data stored in the data repository and receiving one or more particular unique identifiers of the corresponding unique identifiers in response;

determining, at the expense server computer, that the one or more faces in the digital photographic image match a particular user by matching the one or more particular unique identifiers to one or more of the plurality of user profiles;

generating and storing an expense line in an expense data table at the expense server computer, the expense line comprising an identification of the particular user.

8. The one or more non-transitory computer-readable media of claim 7 wherein the instructions, when executed by the one or more processors, further cause performance of:

receiving a second digital photographic image captured using the camera in the mobile computing device;

identifying, in the second digital photographic image, a value indicating a total cost;

updating the expense line to include the total cost.

9. The one or more non-transitory computer-readable media of claim 7 wherein the instructions, when executed by the one or more processors, further cause performance of:

causing displaying the expense line on the mobile computing device;

receiving, from the mobile computing device, input selecting the identification of the particular user;

in response to receiving the input, removing the particular user from the expense line.

10. The one or more non-transitory computer-readable media of claim 7 wherein the instructions, when executed by the one or more processors, further cause performance of:

causing displaying the expense line on the mobile computing device with an option for adding new users to the expense line with a second digital image;

receiving a selection of the option;

in response to receiving the selection, causing displaying an interface for capturing a new digital photographic image;

receiving a second digital photographic image captured using the mobile computing device;

using digitally programmed logic, identifying one or more second faces in the second digital photographic image;

determining that the one or more second faces in the digital photographic image match a second user;

updating the expense line to comprise an identification of the second user.

11. The one or more non-transitory computer-readable media of claim 7 wherein the instructions, when executed by the one or more processors, further cause performance of:

causing displaying the expense line on the mobile computing device with an option for adding new users to the expense report through a search;

receiving a selection of the option;

causing displaying an editable text box for searching for additional users;

receiving textual input in the editable text box and, in response, searching the data repository for data identifying one or more users matching the textual input;

causing displaying data identifying the one or more users;

receiving a selection of a second user of the one or more users;

updating the expense line to comprise an identification of the second user.

12. The one or more non-transitory computer-readable media of claim 7 wherein the instructions, when executed by the one or more processors, further cause performance of:

causing displaying the expense line on the mobile computing device;

receiving a selection of the particular user on the expense line;

causing displaying one or more options for updating the data identifying the particular user;

receiving input selecting the one or more options and, in response, updating the data identifying the particular user in the expense line and in the data repository.

13. A system comprising:
one or more processors;
a memory storing instructions which, when executed by the one or more processors, cause performance of:
causing storing, in a data repository accessible by an external server computer, data identifying a plurality of users, the data comprising feature data extracted from one or more images of the users and corresponding unique identifiers;
storing, at the system, a plurality of user profiles, the plurality of user profiles comprising, for each of the plurality of users, information regarding the user and a corresponding unique identifier of the corresponding unique identifiers;
receiving, at the system, a digital photographic image captured using a camera in a mobile computing device;
identifying, at the system, one or more faces in the digital photographic image by sending the digital photographic image to the external server computer which compares features extracted from the digital photographic image to the feature data stored in the data repository and receiving one or more particular unique identifiers of the corresponding unique identifiers in response;
determining, at the system, that the one or more faces in the digital photographic image match a particular user by matching the one or more particular unique identifiers to one or more of the plurality of user profiles;
generating and storing an expense line in an expense data table at the system, the expense line comprising an identification of the particular user.

14. The system of claim 13 wherein the instructions, when executed by the one or more processors, further cause performance of:
receiving a second digital photographic image captured using the camera in the mobile computing device;
identifying, in the second digital photographic image, a value indicating a total cost;
updating the expense line to include the total cost.

15. The system of claim 13 wherein the instructions, when executed by the one or more processors, further cause performance of:
causing displaying the expense line on the mobile computing device;
receiving, from the mobile computing device, input selecting the identification of the particular user;
in response to receiving the input, removing the particular user from the expense line.

16. The system of claim 13 wherein the instructions, when executed by the one or more processors, further cause performance of: causing displaying the expense line on the mobile computing device with an option for adding new users to the expense line with a second digital image;
receiving a selection of the option;
in response to receiving the selection, causing displaying an interface for capturing a new digital photographic image;
receiving a second digital photographic image captured using the mobile computing device;
using digitally programmed logic, identifying one or more second faces in the second digital photographic image;
determining that the one or more second faces in the digital photographic image match a second user;
updating the expense line to comprise an identification of the second user.

17. The system of claim 13 wherein the instructions, when executed by the one or more processors, further cause performance of:
causing displaying the expense line on the mobile computing device with an option for adding new users to the expense report through a search;
receiving a selection of the option;
causing displaying an editable text box for searching for additional users;
receiving textual input in the editable text box and, in response, searching the data repository for data identifying one or more users matching the textual input;
causing displaying data identifying the one or more users;
receiving a selection of a second user of the one or more users;
updating the expense line to comprise an identification of the second user.

18. The system of claim 13 wherein the instructions, when executed by the one or more processors, further cause performance of:
causing displaying the expense line on the mobile computing device;
receiving a selection of the particular user on the expense line;
causing displaying one or more options for updating the data identifying the particular user;
receiving input selecting the one or more options and, in response, updating the data identifying the particular user in the expense line and in the data repository.

* * * * *